UNITED STATES PATENT OFFICE 2,289,649

DITHIONAPHTHOATES AND METHOD FOR PREPARING THEM

Albert F. Hardman, Akron, Ohio, assignor to Wingfoot Corporation, Wilmington, Del., a corporation of Delaware No Drawing. Application November 29, 1939, Serial No. 306,696

11 Claims. (Cl. 260—500)

This invention relates to hydroxy dithionaphthoic acids and derivatives thereof. More particularly, it relates to such compounds and a method for preparing them by which a naphthol is reacted with carbon bisulfide and an alkali metal hydroxide.

The dithioaromatic acids are usually made by the Grignard reaction by treating magnesium aryl halides with carbon bisulfide. However, the yields are poor and the process is expensive. According to the present invention, alkali metal salts of hydroxy dithionaphthoic acids are prepared by reacting a naphthol with carbon bisulfide and an alkali metal hydroxide. It has been found that this process is particularly applicable to the production of hydroxy dithionaphthoic acids, their salts and other derivatives, and especially to the production of the salts of 2-hydroxy-dithionaphthoic acid, although these compounds cannot be readily made by previously known methods for preparing dithioaromatic acids.

The invention may be illustrated by the preparation of disodium-2-hydroxy-dithionaphthoate from the reaction of beta naphthol with carbon bisulfide and sodium hydroxide. Although the mechanism of the reaction is not known with certainty, it is believed that it proceeds in two steps as follows:

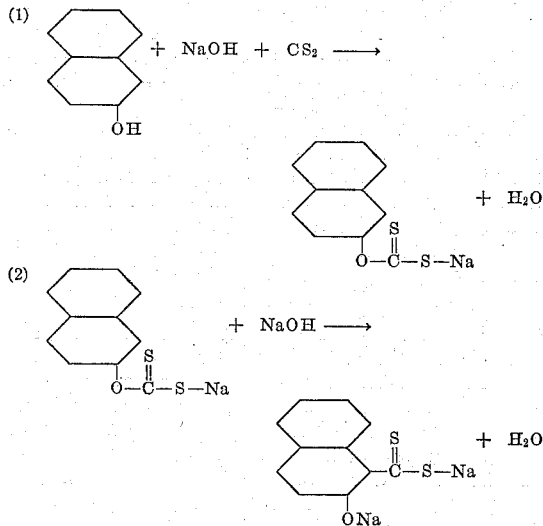

Alternatively, as an equivalent procedure, the alkali metal naphtholate may be prepared and used in place of the mixture of naphthol and alkali metal hydroxide shown in Equation 1.

The reaction should be carried out in a solvent which is preferably anhydrous and is chemically relatively inert to the components of the reaction mixture. Moreover, experiments indicate that the reaction will not take place in all solvent liquids but that the medium must be a common solvent for the reactants, i. e., it must dissolve substantial quantities of each of the reactants. In this connection, it should be kept in mind that the reactants are quite dissimilar from the standpoint of solubility. Thus, carbon bisulfide lies toward one end of the scale, being soluble in benzene type solvents, while the alkali metal naphtholates and alkali metal hydroxides lie toward the opposite end of the scale being soluble in alcohol type solvents, while the naphthols are soluble in both types. There is a relatively small known group of solvents which will dissolve both types of solutes. These may be designated as "common solvents" for the reactants. Suitable solvents are acetone and similar ketones, pyridine, and mixtures of aromatic or aliphatic hydrocarbons with acetone or other ketones, mixtures of ethers and ketones, etc. Acetone is particularly suitable either alone or mixed with other solvents.

A moderate degree of heat is required to carry out the reaction, refluxing temperatures being satisfactory and convenient. The water produced during the reaction should be removed as formed in order to promote the reaction and prevent decomposition of the desired product and may be removed by any convenient means such as by the use of an excess of alkali metal hydroxide, by refluxing the solvent through a desiccating chemical, such as "Drierite," or by choosing a solvent mixture in which water is relatively nonmiscible and from which the water is separated by refluxing through a water collecting trap. If metallic alkali metal is employed instead of the alkali metal hydroxide, the formation of water during the reaction is avoided.

The following examples will serve to illustrate the practice of the invention.

Example 1

A mixture of 40 grams of sodium hydroxide, 144 grams of beta naphthol and 1500 cc. of acetone was refluxed on a steam bath for a short time until the sodium hydroxide had largely dissolved. The mixture, consisting of a solution of sodium naphtholate formed in situ, was then cooled slightly and 120 grams of carbon bisulfide were added, after which refluxing was resumed. Within a few minutes orange-red crystals began to separate. At the end of half an hour, another 40 gram portion of sodium hydroxide was added and, at the end of a further hour, a third 40 gram portion of sodium hydroxide was added. After another hour of refluxing, the warm acetone liquor and crystals were decanted from the heavy layer of water saturated with sodium hydroxide. The crystals were filtered out of the acetone, were washed with fresh acetone and dried at slightly higher than room temperature. The product weighed 324 grams and consisted of fine orange-colored crystals which were found by analysis to contain 2 mols of acetone associated with each mol of disodium-2-hydroxy-dithionaphthoate.

*Example 2*

A mixture of 15 grams of beta naphthol, 300 cc. of acetone, 9 grams of sodium hydroxide and 16 grams of carbon bisulfide was refluxed for 4-5 hours through soxhlet apparatus containing 30 grams of "Drierite," 31 grams of orange needles being obtained. There was no water layer left in the flask.

*Example 3*

Thirty-six grams of beta naphthol, 28 grams of sodium hydroxide, 20 cc. of acetone, 250 cc. of benzol and 20 cc. of carbon bisulfide were refluxed on a steam bath with a water trap between the flask and the condenser. Within a few minutes, bright red crystals began to separate from the reaction mixture while water was slowly distilled off and collected in the trap. After 5-6 hours, 10½ cc. of water had been collected and no more condensation of water could be observed. The crystals were filtered off and washed with benzene. They weighed 88½ grams.

*Example 4*

A mixture of 144 grams of beta naphthol, 1000 cc. of toluene and 30 grams of sodium hydroxide pellets was placed in a 2-liter flask and heated and stirred under a reflux condenser fitted with a 50 cc. water trap until the trap was filled with toluene. One hundred cc. of acetone and 50 cc. of carbon bisulfide were then added. Within a few minutes, red crystals began to separate. After about ½ hour, another 50 cc. of carbon bisulfide was added and an additional 70 grams of sodium hydroxide pellets was added in 15 gram portions at intervals of about ½–¾ hour. At the end of 4 hours, 46 cc. of water had been collected in the trap and the reaction seemed to be complete. The reaction mixture was filtered off and the crystalline product was washed with fresh toluene followed by petroleum ether and was dried at room temperature. The product consisted of 325 grams of fine orange-colored crystals which by analysis appeared to consist of about one mol of acetone associated with each mol of disodium-2-hydroxy-dithio-naphthoate. The yield corresponded to 98-99% of the theoretical, based on the beta naphthol.

*Example 5*

A mixture of 15 grams of beta naphthol, 150 cc. of acetone and 5 grams of metallic sodium was refluxed, cooling the flask to prevent too violent reaction, until about one half of the sodium had dissolved. Sixteen grams of carbon bisulfide were then added and the mixture was refluxed for 3 hours. The orange-red crystalline product was filtered off and washed with acetone, 21 grams being obtained.

As previously indicated, other aliphatic ketones such as methyl-ethyl ketone, methyl-propyl ketone, methyl-butyl ketone, etc. may be used to replace the acetone in the above examples. Preferably, however, such ketones should conform to the formula

in which R and R₁ are alkyl radicals each containing not more than three carbon atoms. Other alkali metal hydroxides, such as potassium hydroxide, may be used instead of sodium hydroxide. Also, alpha naphthol may be used instead of beta naphthol although the reaction seems to proceed more readily and to yield a better characterized product when beta naphthol is used. Moreover, the naphthols employed may contain various inert substituents, such as alkoxy, aryloxy, hydroxyl, halogen, etc. radicals, provided only, in the case of alpha naphthols, that the 2-position is unsubstituted and, in the case of beta naphthols, that the 1-position is unsubstituted. Furthermore, other proportions of reactants and other convenient temperatures may be employed, neither of these being critical so far as is known. As shown by Equations 1 and 2 above, however, the starting materials seem to react in the proportions of one mol of naphthol to one mol of carbon bisulfide to two mols of alkali metal hydroxide.

The following example illustrates the preparation of alkali metal salts of hydroxy-dithionaphthoic acid prepared from α-naphthol.

*Example 6*

A mixture of 75 grams of α-naphthol and 1000 cc. of toluene was refluxed, with stirring, and a solution of 20 grams of sodium hydroxide in 20 cc. of water was slowly added. This added water and the water formed during the reaction were removed from the reflux mixture by means of a trap in the reflux line, 28 cc. being collected. The product of this stage of the reaction was a suspension of sodium-α-naphtholate. To this suspension were added 50 cc. of acetone and 37.5 cc. of carbon bisulfide and the stirring and refluxing were continued. The suspension of sodium-α-naphtholate went into solution, then a red color developed, and then, within a short time, a fine red suspension began to separate. Three 7-gram portions of anhydrous sodium hydroxide in the form of pellets were then added at intervals of one to two hours and the mixture was refluxed until there seemed to be no more reaction taking place. A grand total of 38 cc. of water was collected in the trap, this quantity being substantially that theoretically possible. The suspended red powder was filtered from the hot mixture, washed with benzene and petroleum ether and dried on a warm table, exposed to air. The dried product was a very fine maroon powder and weighed 112 grams.

The alkali metal hydroxy-dithionaphthoates readily lend themselves to the preparation of the free hydroxy dithionaphthoic acids and various derivatives of the same. Example 7 illustrates the preparation of the free acid by treatment of a solution of the sodium salt with a dilute mineral acid.

*Example 7*

Thirty grams of the disodium salt obtained according to Example 5 were dissolved in 200 cc. of cold water and this solution was slowly stirred into 200 cc. of cold dilute hydrochloric acid. Orange-colored crystals separated, 20 grams being obtained after washing and drying. These crystals melted with decomposition at 95° C. and after recrystallization from warm benzene melted at 99° C. Sulfur, by analysis—28.86%, calculated for 2-hydroxy-dithionaphthoic acid—29.0%. The free acid is somewhat unstable and slowly decomposes with the evolution of hydrogen sulfide.

Other metals salts, such as the basic zinc salt, may be prepared by treating a water solution of the disodium salt with a molecular equivalent of a solution of a salt of the desired metal, as shown in the following example.

Example 8

Thirty-three grams of the disodium salt obtained according to Example 5 were dissolved in about 700 cc. of water. A solution of 29 grams of $ZnSO_4 \cdot 7H_2O$ in about 100 cc. of water was then added. An orange-colored suspension formed which slowly changed color to a brilliant red. The mixture was heated on a steam bath for ½ hour and the product was then filtered off and washed with hot water and dried to obtain 28 grams of red powder.

Stable salts may be obtained by reacting the hydroxy-dithionaphthoic acid with strong organic bases, as shown in the following example.

Example 9

A solution of 100 grams of the crude disodium salt in 300 cc. of water was treated with 30 grams of ammonium chloride to form a solution of ammonium-2-hydroxy-dithionaphthoate and sodium chloride and filtered and to the filtrate 30 grams of cyclo-hexylamine were added. A yellow, curdy precipitate formed at once. This was filtered off, washed with cold water and dried. The product, which was the cyclohexylamine salt of 2-hydroxy-dithionaphthoic acid, weighed 73 grams and melted at 119° C. Sulfur, by analysis—20.36%, calculated for $C_{17}H_{21}ONS_2$—20.02%. Nitrogen, by analysis—4.32%, calculated—4.39%.

The alkali metal salts of the hydroxy-dithionaphthoic acid also react with various halogen-substituted organic compounds in a manner typical of the dithioacid salts. For example, new compounds are readily obtained by reaction with chloracetic acid, its salts, esters and amides, as demonstrated by the following examples.

Example 10

A solution consisting of 37 grams of disodium-2-hydroxy dithionaphthoate in 100 cc. of water was mixed with a solution of 10 grams of chloracetic acid in 50 cc. of water. Within a few minutes the mixture became warm and crystals began to separate. The mixture was allowed to stand at room temperature for 3 hours and the crystalline product was then filtered off and washed with cold water, 34 grams being recovered. The product was recrystallized from 300 cc. of hot water and dried at slightly above room temperature to give 28 grams of bright yellow crystals which became darker on drying. Sulfur, by analysis—19.71%, calculated for $C_{13}H_9O_3S_2Na \cdot 2H_2O$—19%. When the product of this reaction is dried at room temperature, it contains 2 mols of water per mol of product, this water of crystallization being readily driven off at a temperature of 85–90° C. The compound may be called sodium-2-hydroxy-dithionaphthoic acetate.

Example 11

Thirty grams of the sodium salt obtained according to Example 10 were dissolved in hot water and precipitated with an excess of dilute hydrochloric acid. The crude product was recrystallized from a mixture of one part of alcohol to 2 parts of water to give 21 grams of orange-colored needles melting at 174° C. This product was 2-hydroxy-dithionaphthoic acetic acid. Sulfur, by analysis—23.44%, calculated—23%.

Example 12

The amide of the free acid obtained according to Example 11 was obtained by mixing a solution of 27 grams of disodium-2-hydroxy-dithionaphthoate in 100 cc. of water with a solution of 10 grams of chloracetamide in 50 cc. of water. Within a few seconds the mixture became thick with orange-colored crystals. It was allowed to stand for 4 hours when the crystals were filtered off and washed. The product weighed 14 grams and melted at 162° C.

Example 13

The ethyl ester of 2-hydroxy-dithionaphthoic acetic acid was prepared by dissolving 200 grams of crude disodium-2-hydroxy dithionaphthoate in 600 cc. of water, treating this solution with a slow stream of carbon dioxide for several hours in order to prepare a solution of the monosodium salt. This solution was then treated with 61 grams of ethyl chloracetate. The mixture immediately became warm and the oily suspension soon crystallized. The crude product weighed 94 grams and on recrystallization from 300 cc. of alcohol yielded 63 grams of yellow crystals melting at 119° C.

The formation of salts of organic bases with hydroxy-dithionaphthoic acetic acids prepared as in Example 11 proceeds as shown in the following example.

Example 14

Five grams of cyclohexylamine were added to a solution of 12 grams of 2-hydroxy-dithionaphthoic acetic acid in 50 cc. of hot alcohol. On cooling and filtering, 15 grams of yellow crystals, melting at 116–117° C., were obtained.

In addition to the basic zinc salt described in Example 8, the normal zinc salt may be prepared by half neutralizing the disodium-2-hydroxy-dithionaphthoate with an acid and then precipitating the solution of the monosodium salt with the necessary quantity of zinc sulfate. Furthermore, the strongly basic character of the disodium hydroxy-dithionaphthoate may be used to advantage in preparing a double zinc salt of the dithionaphthoate and an acidic material such as 2-mercaptobenzothiazole, stearic acid, etc. as shown by the following example.

Example 15

Thirty-four grams of disodium-2-hydroxy-dithionaphthoate were dissolved in 400 cc. of water and 17 grams of 2-mercaptobenzothiazole were added and the mixture was heated, diluted to 700 cc. and filtered. The 2-mercaptobenzothiazole was almost completely dissolved. A solution of 30 grams of $ZnSO_4 \cdot 7H_2O$ in 100 cc. of hot water was then added, a fine yellow suspension forming. The mixture was digested on a steam bath for one hour, during which time the suspension slowly changed to a dark maroon color and became flocculent. The product was filtered off, washed with hot water and dried to form 43 grams of a very fine and soft maroon-colored powder.

Various other derivatives of disodium-hydroxy-dithionaphthoates may be formed by reaction with dinitrochlorbenzene, chlor acetone, benzyl chloride, ethyl chlorcarbonate, etc. and by suitable treatment to yield the lead and alkaline earth salts, diphenylguanidine and other amine salts and the mono- and disulfides.

Many of the derivatives of hydroxy-dithionaphthoic acids are accelerators of the vulcanization of rubber. In order to test these properties, various derivatives were incorporated into rubber in accordance with the following formula:

| | Parts |
|---|---|
| Smoked sheets | 100.0 |
| Sulfur | 3.0 |
| Zinc oxide | 5.0 |
| Accelerator | 0.5 |

Samples were cured and tested to yield the following results:

BASIC ZINC-2-HYDROXY-DITHIO-NAPHTHOATE

| Temp. cure, min./° F. | Tensile in kgs./cm.² | Elongation in percent | Tensile at 500% elong. |
|---|---|---|---|
| 15/240 | 138 | 865 | 16 |
| 20 | 159 | 805 | 25 |
| 30 | 172 | 730 | 36 |
| 40 | 185 | 720 | 41 |

2-HYDROXY-DITHIONAPHTHOIC ACID

| | | | |
|---|---|---|---|
| 10/220 | 70 | 855 | 13 |
| 20 | 138 | 800 | 23 |
| 30 | 174 | 775 | 31 |
| 40 | 179 | 745 | 35 |
| 60 | 182 | 745 | 37 |

CYCLOHEXYLAMINE SALT, 2-HYDROXY-DITHIONAPHTHOIC ACID

| | | | |
|---|---|---|---|
| 5/220 | 164 | 800 | 29 |
| 10 | 208 | 685 | 58 |
| 15 | 231 | 680 | 68 |
| 20 | 248 | 680 | 82 |
| 25 | 245 | 650 | 95 |

SODIUM-2-HYDROXY-DITHIO-NAPHTHOIC ACETATE

| | | | |
|---|---|---|---|
| 30/240 | 96 | 845 | 16 |
| 40 | 130 | 845 | 19 |
| 60 | 148 | 820 | 23 |
| 80 | 145 | 810 | 25 |

2-HYDROXY-DITHIONAPHTHOIC ACETIC ACID

| | | | |
|---|---|---|---|
| 10/260 | No cure | | |
| 20 | 68 | 890 | 11 |
| 30 | 110 | 850 | 17 |
| 40 | 118 | 830 | 19 |
| 60 | 128 | 825 | 21 |

2-HYDROXY-DITHIONAPHTHOIC ACETAMIDE

| | | | |
|---|---|---|---|
| 20/260 | 72 | 850 | 12 |
| 30 | 108 | 860 | 15 |
| 40 | 104 | 835 | 17 |
| 60 | 118 | 840 | 18 |
| 80 | 107 | 835 | 19 |

CYCLOHEXYLAMINE SALT OF 2-HYDROXY-DITHIONAPHTHOIC ACETIC ACID

| | | | |
|---|---|---|---|
| 30/240 | 45 | 845 | 9 |
| 40 | 97 | 810 | 17 |
| 60 | 160 | 785 | 27 |
| 80 | 140 | 745 | 29 |

ETHYL ESTER OF 2-HYDROXY-DITHIONAPHTHOIC ACETIC ACID

| | | | |
|---|---|---|---|
| 20/285 | 59 | 910 | 9 |
| 30 | 81 | 905 | 13 |
| 40 | 84 | 895 | 13 |
| 60 | 86 | 890 | 13 |
| 80 | 94 | 915 | 14 |

CO-PRECIPITATED ZINC SALTS OF 2-HYDROXY-DITHIONAPHTHOIC ACID AND 2-MERCAPTOBENZOTHIAZOLE

| | | | |
|---|---|---|---|
| 15/240 | 125 | 800 | 23 |
| 20 | 131 | 755 | 26 |
| 30 | 150 | 750 | 29 |
| 40 | 153 | 740 | 32 |
| 60 | 158 | 730 | 44 |

The foregoing data demonstrate that a wide variety of excellent curing characteristics may be obtained by the use of various derivatives of hydroxy-dithionaphthoic acid and emphasize the great value of the alkali metal hydroxy-dithionaphthoates as intermediates in the preparation of such accelerators.

While the invention has been described by reference to preferred embodiments thereof, it will be apparent that changes may be made therein and, accordingly, such invention is not to be limited by such description but only by the appended claims in which it is intended to set forth all patentable features thereof.

What I claim is:

1. A process for preparing alkali metal salts of hydroxy-dithionaphthoic acids which comprises reacting, in a common solvent, a naphthol, carbon bisulfide and an alkali metal hydroxide.

2. A process for preparing alkali metal salts of hydroxy-dithionaphthoic acids which comprises reacting, in a common solvent and under substantially anhydrous conditions, a naphthol, carbon bisulfide and an alkali metal hydroxide.

3. A process for preparing alkali metal salts of 2-hydroxy-dithionaphthoic acid which comprises reacting, in a common solvent, one mol of beta naphthol with one mol of carbon bisulfide and two mols of an alkali metal hydroxide.

4. A process for preparing alkali metal salts of hydroxy-dithionaphthoic acids which comprises reacting a naphthol, carbon bisulfide and an alkali metal hydroxide in a solvent having the formula

in which R and R₁ are alkyl radicals each having not more than three carbon atoms.

5. A process for preparing alkali metal salts of 2-hydroxy-dithionaphthoic acid which comprises reacting, in acetone, beta naphthol, carbon bisulfide and an alkali metal hydroxide.

6. A process for preparing disodium-2-hydroxy-dithionaphthoate which comprises reacting, in acetone and under substantially anhydrous conditions, beta naphthol, carbon bisulfide and sodium hydroxide.

7. A process for preparing the disodium salt of 2-hydroxy-dithionaphthoic acid which comprises reacting, in a mixture of toluene and acetone, beta naphthol, sodium hydroxide and carbon bisulfide.

8. A process for preparing alkali metal salts of 2-hydroxy-dithionaphthoic acid which comprises reacting, in a mixture of an aromatic hydrocarbon and an aliphatic ketone, beta naphthol an alkali metal hydroxide and carbon bisulfide.

9. As new compositions of matter, the alkali metal salts of 2-hydroxy-dithionaphthoic acid.

10. As a new composition of matter, disodium-2-hydroxy dithionaphthoate.

11. As a new composition of matter, crystalline disodium-2-hydroxy-dithionaphthoate with which is associated at least one and not more than two mols of an aliphatic ketone.

ALBERT F. HARDMAN.